United States Patent [19]

Scott

[11] Patent Number: 5,116,496
[45] Date of Patent: May 26, 1992

[54] MEMBRANE-CONTAINING WELLS FOR MICROTITRATION AND MICROFILTRATION

[75] Inventor: John R. Scott, San Jose, Calif.

[73] Assignee: Minnesota Mining and Manufacturing Company, St. Paul, Minn.

[21] Appl. No.: 671,528

[22] Filed: Mar. 19, 1991

[51] Int. Cl.$^5$ .................... B01D 24/20; B01D 21/24
[52] U.S. Cl. .................... 210/232; 210/455; 422/99; 422/101; 422/102; 73/863.23
[58] Field of Search ............... 210/321.84, 195.2, 295, 210/445, 453, 232, 455; 422/99, 101, 102; 435/7.22; 73/863.23

[56] References Cited

U.S. PATENT DOCUMENTS

| | | | |
|---|---|---|---|
| 4,154,795 | 5/1979 | Thorne | 422/102 |
| 4,407,943 | 10/1983 | Cole et al. | 436/528 |
| 4,493,815 | 1/1985 | Fernwood et al. | 210/232 |
| 4,642,220 | 2/1987 | Björkman | 73/863.23 |
| 4,797,259 | 11/1989 | Matkovich et al. | 422/102 |
| 4,927,604 | 5/1990 | Mathus et al. | 210/455 |

FOREIGN PATENT DOCUMENTS 288793 4/1988 European Pat. Off.
2199946 7/1988 United Kingdom.

OTHER PUBLICATIONS

Zalis et al., "Routine Dot-Blot Assay of Multiple Serum Samples Using a Simple Apparatus", J. Immunol. Meth., 101:261-4 (1987).

Long, D., "Screening Hybridomas with the S&S Minifold® I 96-Well Manifold and Incubation Plate" in Sequences: Application Update, published by Schleicher & Schuell, Inc. (1986).

Primary Examiner—Robert A. Dawson
Assistant Examiner—Ana M. Fortuna
Attorney, Agent, or Firm—Gary L. Griswold; Carolyn A. Bates

[57] ABSTRACT

A well for use in microtitration and/or microfiltration procedures. The well has a membrane in the bottom that is retained on a lower lip by means of a ring that is itself retained at a predetermined position in, and along the wall of, the well.

6 Claims, 1 Drawing Sheet

MEMBRANE-CONTAINING WELLS FOR MICROTITRATION AND MICROFILTRATION

FIELD OF THE INVENTION

The present invention relates to microtitration wells. In another aspect the invention relates to microfiltration devices.

BACKGROUND OF THE INVENTION

Microtitration wells have become a standard part of most immunoassay procedures. Such wells can be used individually or connected together, e.g., in the form of strips or discs, or in the form of conventional 96 well trays See, e.g., U.S. Pat. No. 4,154,795. Given their standard size and configuration many devices have been manufactured that are adapted to hold, transfer, fill and/or empty, and otherwise use such wells in a variety of ways.

In some applications membranes have been placed onto the bottoms of open-bottomed wells and held in place by heat sealing, gluing, or sonically welding the membrane to the bottom surfaces of the walls of the well. See, e.g., U.S. Pat. No. 4,407,943. Such membranes have been described as being useful as supports, in order to retain one or more reaction components within the well, and for allowing sample and other solutions to flow through the membrane.

In addition to their use to support reactants, membranes are also frequently used for their ability to filter solutions, e.g., to remove particulates from the solution. The Minifold TM micro-sample filtration manifold available from Schleicher & Schuell, Inc., Keene, N.H., involves the use of filter discs overlaid onto silicone O-rings in a sample well plate. A separate filter support plate is then aligned over the sample well plate and the two plates clamped together. After use, i.e., application of vacuum and introduction of samples, the plates can be separated again, leaving the filter discs in place resting on top of the filter support plate.

Disadvantages to the use of membranes that are adhered to the bottom of open wells can include poor initial adhesion, loss of adhesion over time (i.e., stability), incompatability of adhesives and other such materials with either the wall or membrane materials and/or with components of the samples themselves, the difficulty inherent in actually adhering each membrane to each well, leakage of solutions at poorly adhered areas, and well-to-well "cross talk", i.e., solutions being absorbed by the membranes of adjacent wells due to the close physical proximity of membranes, thereby leading to inaccurate or incorrect readings.

SUMMARY OF THE INVENTION

The present invention provides a well for use in performing a microtitration or microfiltration procedure, the well comprising a hollow tubular wall having an axis, upper and lower axially spaced ends, an inner surface, and a lip extending radially inwardly of the inner surface at the lower end, the lip having a distal surface defining an aperture;

a membrane having a top surface, a bottom surface, and a periphery, and having a shape and size adapted so that a peripheral portion of the membrane adjacent the periphery contacts the upper surface of the lip, with a central portion of the membrane extending across the aperture;

a generally annular ring having an axis, an outer surface, and a lower surface having a width dimension radially of the ring that is generally the same as the radial width of the top surface of the lip, the ring being retained in a predetermined position along the inner surface of the wall with the lower surface of the ring against the upper surface of the membrane and pressing the peripheral portion of the membrane against the lip.

and means for retaining the outer surface of the ring in engagement with the inner surface of the wall to retain the ring in the predetermined position along the wall.

The invention also provides a plurality of such wells, connected together as in the form of a strip, disc, or 96 well tray.

DESCRIPTION OF THE PREFERRED EMBODIMENTS

The present invention provides a well for use in performing microtitration or microfiltration procedures, or both. When such a well is used for microtitration, e.g., for an immunoassay procedure, the membrane will generally be used to support one or more components of a reaction, such as an immunological reaction between an antigen and an antibody. The component can be contained in, on, and/or through the membrane, e.g., by physical entrapment, chemical binding, and/or passive adsorption.

The reaction can take place throughout the well, e.g., to the extent the supported component is also present on the walls or elsewhere within the well. The reaction can also take place as solutions flow through the membrane, or are drawn through, as by applied vaccum. Advantages of having the membrane retained in the bottom of the well include both the added surface area that a membrane such as a microporous membrane provides, and the ability to filter draw solutions through the membrane.

When used for microfiltration the membrane is generally used to remove one or more components from solutions passed through it, e.g., on the basis of physical, biological, and/or chemical interactions between the membrane, or materials retained in or on the membrane, and the component to be retained.

Preferred wells have substantially the same overall dimensions as standard microtitration wells, e.g., such as the wells and microtest plate disclosed in U.S. Pat. No. 4,154,795, the disclosure of which is incorporated herein by reference. Such preferred wells can have, for instance an overall height of about 0.4 to about 0.6 inches, and particularly prefered are wells having a height of about 0.5 inches. In this way the preferred wells can be used in and with devices and instruments, such as liquid handling systems and readers, that are commonly available for use with conventional microtitration wells.

Figure 1:
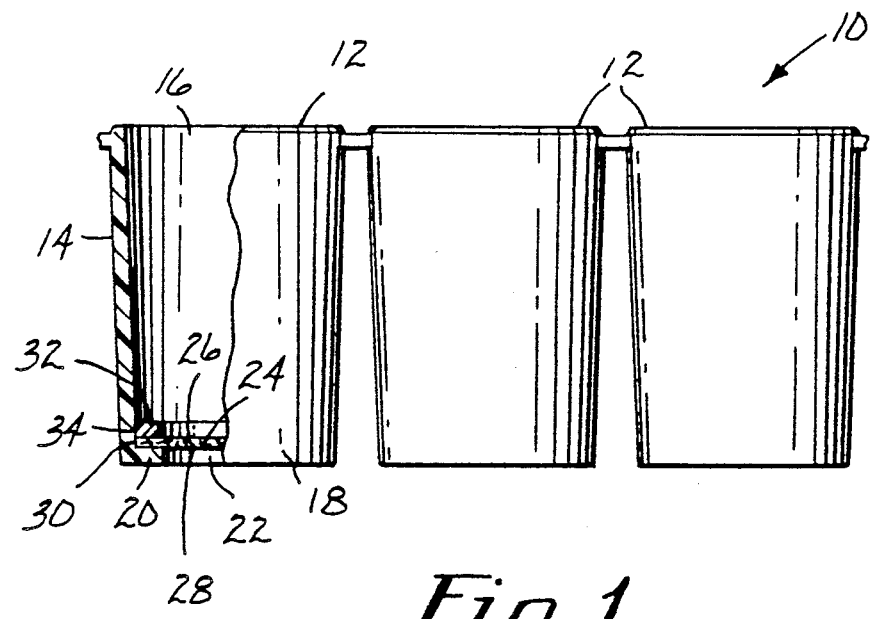
FIG. 1 shows a strip of wells of the present invention, with one partially broken away to show cross-sectional detail.

A preferred well of the invention will be further described with reference to the Drawing. In FIG. 1 is shown a strip (10) of three wells with one well (12) partially broken away to show cross-sectional detail.

Well (12) comprises a hollow tubular wall (14) having an axis, upper (16) and lower (18) axially spaced ends, an inner surface, and a lip (20) extending radially inwardly of said inner surface at said lower end, said lip having a distal surface defining an aperture (22). The wall of the well is preferably tapered as it approaches the lower end, e.g., by about one-half degree to about 5 degrees, and preferably by about one degree to two degrees. For instance, in a particularly preferred embodiment the diameter at the upper end of a well is about 0.272 inches, and the wall tapers so as to form an inner diameter of about 0.247 inches at the predetermined position, immediately above the lip. The taper allows the memrbrane and ring to be more easily positioned, guided, and pushed along the wall in order to position the membrane on the lip and then place the ring in its predetermined position.

The tubular wall is preferably cylindrical, but optionally can have multiple sides, e.g., multiple flat sides in order to form a pentagonal, hexagonal, heptagonal, or octagonal shape, or a combination of flat and rounded portions.

A membrane (24) having a top surface (26), a bottom surface (28), and a periphery, and having a shape and size adapted so that a peripheral portion (30) of the membrane adjacent the periphery contacts the upper surface of the lip, with a central portion of the membrane extending across the aperture.

Those skilled in the art will recognize that the choice of membrane will depend on the intended use of the well. Any suitable membrane can be used, e.g., for supporting reaction components or for filtration, including those useful for qualitative or quantitative (i.e., gravimetric) uses. Suitable membranes provide an optimal combination of such properies as absorbancy, wet strength, surface area, wettability (e.g., hydrophilicity or hydrophobicity), filtration speed, retention capacity, pore size, thermal stability, binding capacity, air permeability, color, thickness, and cost.

Examples of suitable membranes include, but are not limited to those made of nitrocellulose, regenerated cellulose, nylon (such as "Nylon 66"), polysulfone, diazotized papter, glass fiber, blown microfibers, and paper. Suitable membranes are available from a variety of sources, e.g., Schleicher & Schuell, Inc., Keene, N.H. and Millipore Corp., Bedford, Mass. Examples of preferred membranes for use in immunoassay are microporous membranes.

Wells of the present invention further comprise a generally annular ring (32) having an axis, an outer surface (34), and a lower surface (36) having a width dimension radially of the ring that is generally the same as the radial width of the top surface of the lip, the ring being retained in a predetermined position along the inner surface of the wall with the lower surface of the ring against the upper surface of the membrane and pressing the peripheral portion of the membrane against the lip.

The ring can be made of any suitable material that provides an optimal combination of such properties as resilience, chemical compatability with sample or reaction components, and cost. Examples of suitable materials for making rings include rubber, silicone, and styrene, such as styren "666v" (available from Dow Chemical Co.). In a preferred embodiment a ring can be stamped or cut out of a sheet of styrene having a thickness of about 0.01 inches to about 0.05 inches, and preferably from about 0.01 inches to about 0.03 inches.

Figure 2:
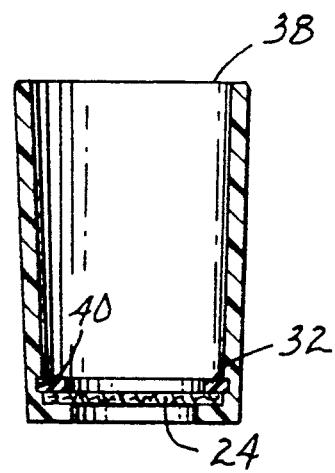
FIG. 2 shows a cross-sectional view of an alternative embodiment of a well of the present invention, showing a recessed groove in the wall at the predetermined position of the ring.

The well of the present invention further comprises means for retaining said outer surface of said ring in engagement with the inner surface of the wall to retain the ring in its predetermined position along the wall. In FIG. 1 the ring is shown frictionally engaged against the wall of the well at the predetermined position. The frictional engagement is made possible by proper adjustment of the relative sizes of the outer diameter of the ring and the inner diameter of the well at the predetermined position. In alternative and preferred embodiment shown in FIG. 2 the ring (32) is shown retained in well (38) in a recessed annular groove (40) in the wall of the well at the predetermined position.

Wells of the present invention can be made by techniques well within the skill of those in the art. The wall itself, including the lip, is preferably injection molded as a unitary piece. Membranes of suitable shape can be stamped or otherwise cut out of sheets of the membrane material. Rings can also be cut out of sheets of the respective material.

In assembling the well, the membrane can be inserted into the upper end of the well and pressed down into the well in any suitable manner until it rests in its position on the lip. The ring can then be inserted into the upper end of the well and similarly pressed down into the well until it comes to its predetermined position in contact with the membrane, in order to retain the membrane against the lip. Care should be taken to avoid cupping, folding, or tearing the membrane Preferably the entire peripheral portion of the membrane contacts the lip and the entire lower surface of the ring contacts the upper surface of the peripheral portion of the membrane, thereby sealing the well from the flow of fluid around the edges of the membrane.

Preferably all steps involved in the assembly of a well are performed in a continuous, sequential process, e.g., involving cutting and inserting the membrane, followed by cutting and inserting the ring.

The well of the present invention can be used for microtitration and/or microfiltration procedures that employ a retained membrane. See, for example,, Zalis et al., "Routine dot-blot assay of multiple serum samples using a simple apparatus", *J. Immunol. Meth.*, 101:261–264 (1987); Long, D., "Screening Hybridomas with the S&S Minifol ® I 96-well Manifold and Incubation Plate" in "Sequences: Application Update" (and references cited therein) published by Schleicher & Schuell, Inc., 1986 (screening hybridomas); U.S. Pat. Nos. 4,407,943 (immunoassay), 4,493,815 (filter assays and fluid retention applications), and 4,642,220 (analyses with at least one incubation step); European Patent Application No. 288,793 (solid-phase immunoassay); and UK Patent Application GB 2 199 946A (diagnostic device); the entire disclosure of each of which are hereby incorporated by reference.

When used as a microtitration well, the signal that is generally generated and read in such situations can be read in any suitable manner. For instance, the signal can be read in a solution contained within the well or that is removed from the well, as by aspiration. Likewise the signal can be read directly on the surface of the membrane, as in a conventional "dot blot" assay. Also the signal can be read in a solution drawn through the membrane and separately collected.

For either microtitration or microfiltration, vaccum can be applied in any suitable fashion in order to draw fluids from the well through the membrane. For instance, a disc or tray of such wells can be inserted in a device, e.g., a manifold, that is adapted to seal the bottoms of the wells from air, together with means to provide a sufficient vacuum to draw the sample or other solutions through the membrane at the desired time and with the desired force.

The signal that is generated in the course of a microtitration assay can be read by any suitable means, e.g., by visual analysis, or by the detection of fluorometric, spectrophotometric, radiometric, or chemiluminescent signal.

The foregoing description is offered primarily for purposes of illustration. While a variety of embodiments have been disclosed, it is not intended that the present invention be limited to the particular structures or methods of operation set forth above. It will be apparent to those skilled in the art that numerous modifications and variations not mentioned here can be made without departing from the spirit and scope of the invention as claimed below.

What is claimed is:

1. A well for use in performing microtitration or microfiltration, said well comprising
    a hollow tubular wall having an axis, upper and lower axially spaced ends, an inner surface, and a lip extending radially inwardly of said inner surface at said lower end, said lip having a distal surface defining an aperture;
    a membrane having a top surface, a bottom surface, and a periphery, and having a shape and size adapted so that a peripheral portion of said membrane adjacent said periphery contacts the upper surface of said lip, with a central portion of said membrane extending across said aperture;
    a generally annular ring having an axis, an outer surface, and a lower surface having a width dimension radially of said ring that is generally the same as the radial width of the top surface of said lip, said ring being retained in a predetermined position along the inner surface of said wall with the lower surface of said ring against the upper surface of said membrane and pressing said peripheral portion of the membrane against the lip,
    and means for retaining said outer surface of said ring in engagement with the inner surface of said wall to retain said ring in said predetermined position along said wall.

2. A well according to claim 1 wherein said inner wall of the well is tapered toward the axis as it approaches said lip.

3. A well according to claim 2 wherein said inner wall is tapered about one degree to about two degrees as it approaches said lip.

4. A well according to claim 1 wherein said tubular wall is cylindrical.

5. A well according to claim 1 wherein said wall contains an annular recessed groove in order to retain said ring at said predetermined position.

6. A plurality of wells according to claim 1 wherein the wells are connected in a form selected from a strip, a disc, or a tray.

* * * * *

UNITED STATES PATENT AND TRADEMARK OFFICE
CERTIFICATE OF CORRECTION

PATENT NO. : 5,116,496
DATED : May 26, 1992
INVENTOR(S) : John R. Scott It is certified that error appears in the above-identified patent and that said Letters Patent is hereby corrected as shown below:

Col. 3, line 66      "666$v$" should read --666™--

Signed and Sealed this

Thirty-first Day of August, 1993

Attest:

BRUCE LEHMAN

*Attesting Officer*      *Commissioner of Patents and Trademarks*